UNITED STATES PATENT OFFICE.

FRANCIS CORNWALL TAYLOR, OF NEW YORK, N. Y., ASSIGNOR OF ONE-HALF TO ROBERT C. CAMPBELL, OF PHILADELPHIA, PENNSYLVANIA.

ART OF PRINTING IN SEVERAL COLORS BY ONE IMPRESSION.

SPECIFICATION forming part of Letters Patent No. 432,580, dated July 22, 1890.

Application filed August 6, 1888. Serial No. 282,079. (No specimens.)

*To all whom it may concern:*

Be it known that I, FRANCIS CORNWALL TAYLOR, of New York, in the county of New York and State of New York, have invented a new and useful Improvement in the Art of Printing in Several Colors by one Impression of one Form, of which the following is a specification.

Heretofore in printing in several colors by one impression of one form parallel stripes of different-colored inks have been formed on the ink-plate and corresponding parallel bands of different-colored inks have been formed on the ink-rolls; but so far as I know no one has hitherto been practically successful in practicing this plan of chromatic printing, for the reason that the inks in the parallel stripes and corresponding bands referred to have, first, flowed sidewise on the plate and rollers and so run into and mixed with each other, and, second, have failed to distribute into films of uniform thickness, in consequence whereof some of the types have been overloaded with ink and others not sufficiently supplied with ink. Impressions taken from these types have consequently been blurred and blotched in some places and faint and indistinct in others.

The object of my invention is to enable printers to successfully practice this art of printing in several colors by one impression of one form by first preventing the stripes and bands (either or both) referred to from flowing together, and, second, by securing stripes and bands (either or both) of different-colored inks that are evenly distributed—that is, distributed into films of uniform thickness to prevent the blurred, blotched, and faint impression above referred to.

My improvement in the art of printing in several colors by one impression of one form consists in supplying the type-inking device or devices with inks of different colors, chemically treated, in a manner to well nigh prevent the different-colored inks on the inking device or devices from running together or intermixing and thereby changing any of the desired colors. In practicing my invention I have successfully used many of the one-color-printing presses now commonly found in printing offices, (the Campbell, Gordon, Universal, Golden, Nonpareil, Potter, and various other presses well known to all skilled in the art,) and have applied my inks, chemically treated, as hereinafter explained, directly to the distributing-rollers with a knife or the like, (of course the distributing-rollers may be provided with the prepared inks by means of any suitable device or specially-constructed apparatus,) laying the inks on the distributing-rollers in contiguous masses and then working the presses to more effectively distribute the inks, and then proceeding in the usual manner, taking care, however, to keep the ink-plates from rotating in those presses in which rotary ink-plates are used, and to keep the rollers from endwise movement; and I have successfully printed as many as sixty-two colors and tints from a single form at one impression thereof, and have taken many thousand impressions in different colors without any practical variation in the width of the stripes or bands of the colored inks.

My invention is based on my discovery that the ordinary printing-inks of commerce may be treated with certain chemicals hereinafter specified, so that the inks become largely self-distributing, and when on the ink-distributing plate and type-inking rollers in contiguous stripes and bands will not flow together sufficiently to render my plan impractical, but will preserve for practical purposes their formation in stripes of various widths on the plate and in corresponding bands of various widths on the type-inking roller or rollers.

By many practical experiments I have demonstrated that the chemicals named hereinafter, when used in the manner explained, will cause the inks to act as herein explained; but I do not know but other chemicals may be used for the same purpose, and I do not intend to limit myself to the use of the chemicals herein named, for my invention does not depend on the use of the specified chemicals, but is based on my discovery that ordinary printing-inks may be made to hold a position given them, whereby much of the special apparatus hitherto deemed necessary in chromatic printing is rendered unnecessary.

In order to enable others to practice my invention, I will now explain the manner in which the printing-inks of commerce may be treated in order to practice it.

Take an ink of the desired color and first add to it a quantity of a compound composed of balsam of copaiba, three-fourths pound, apothecary's weight; glycerine, one-fourth pound, apothecary's weight; crude petroleum, about thirty drops; oil of sandal-wood, from one hundred and twenty to one hundred and thirty drops, according to the drying qualities of the glycerine. Crude black petroleum is the best, and a sufficient quantity of the above mixture or compound is to be stirred with the ink to bring the ink to the consistency of a thick sirup. Next add to the ink thus treated a little of a mixture consisting of two-thirds ether and one-third chloroform, using enough of the mixture to deaden or stagnate the ink. Inspection of the ink when treated with the two mixtures thus explained will show that the particles or molecules of the ink are apparently trying to work toward the middle of the mass, and this is what I call "stagnation" or "deadening," because the ether or chloroform tend to keep the ink from spreading and thereby to hold the ink in the desired position. Thirdly, add to the ink about the same quantity of ammonia as was used of the ether and chloroform, using the strongest aqua-ammonia. Inspection of the ink after being treated with the ammonia (as well as the other mixtures mentioned) shows small bubbles rapidly forming in the ink. The ink is thus made ready for use and the workman then supplies the ink-distributing roller with inks of the desired color in any desired way, (with a knife, a brier, or from a specially-constructed fountain, or in any other way,) spreading on the distributing-roller, for example a little red ink sufficient to make a band thereon of a width correspondinng to the size of type in the line to be printed in red, then putting on the roller enough, say, blue ink, to make a band on the roller of a width equal to the size of type in the line that is to be printed in blue, and so on. The masses of the different-colored inks may be contiguous or at a distance apart. If contiguous, it will be found that the different-colored inks will not mix together sufficiently to be objectionable, but each will tend to keep its own place, and when the press has been worked to thoroughly distribute the inks (which are very largely self-distributing, owing to the breaking of the bubbles under the rollers and the consequent spreading of the inks) and the type-inking roll or rollers have been provided with ink from the ink-plate on which the colors appear in parallel stripes the rollers will show a series of contiguous or separate bands of different colors, according to the number of differently-colored inks used, and the type-inking rollers will show a series of contiguous or separate bands of different colors taken from the ink-plate, and thus the different lines of type in the form will be inked with different-colored inks, and a sheet be printed at one impression of one form in many different colors.

I have said that the inks when treated as I have explained, even though contiguous on the ink-distributing roll or its equivalent, will hold their position, and this is practically the case. The exact fact, however, is that contiguous inks will mix for about the width of a lead, (agate width,) but this is unimportant, as will be plain to all skilled in the art. Should it be deemed important to minimize the liability of the contiguous inks mixing, a little more chloroform and ether than is suggested above may be used, the greater the quantity of chloroform and ether mixed with the inks treated with the first mixture mentioned the greater the tendency of a mass of the treated ink to work toward its middle— that is, to hold its place. It will be seen that the tendency of inks treated as explained is, when placed in contiguous masses, to work each way from its neighbor, owing to its tendency to work toward its own middle.

It will now be apparent from the foregoing that by practicing my invention, sheets printed in a great variety of different colors may be produced at a single impression of one form, and that the ordinary one-color-printing presses may be used to do chromatic printing at substantially the same cost as one-color printing; and I think that when expensive inks are used I save the printer a considerable percentage in the cost of ink, because the chemicals in my mixtures, above referred to, are comparatively inexpensive and increase the bulk of the ink considerably.

It is to be noted that if the different colored inks, as above explained, are put on so as to lap each other a blend will be produced, and the line printed from types so inked will show blended colors.

The composition first named, consisting of balsam of copaiba, glycerine, petroleum, and sandal-wood, forms the subject-matter of my patent, No. 401,766, granted April 23, 1889, on an application filed August 6, 1888.

Having thus explained my invention in suchwise as to enable all skilled in the art to practice it, I desire to cover my invention, broadly, and not to limit myself to the use of the particular chemicals hereinbefore referred to, because it is possible that others may find other drugs or chemicals that will have substantially the same effect on inks that the drugs and chemicals mentioned by me have.

I am aware of I. L. G. Rice's patents, No. 89,244, dated April 20, 1869, and No. 104,203, dated June 14, 1870; Isaac Hart's patent, No. 144,673, granted November 18, 1873; William H. Golding's patent, No. 322,441, granted July 21, 1885; Henry Barth's patent, No. 70,067, granted October 22, 1867, and T. F. Adam's patent, No. 3,744, granted September 17, 1844, and disclaim all that is shown in them.

I claim—

1. The herein-described improvement in the art of printing in several colors at one impression of a single form, which consists, first, in providing the inking device with parallel bands or stripes of different-colored and properly-distributed inks chemically treated, substantially as described, to prevent the inks in these bands or stripes from flowing sidewise; second, in inking the form with said inking device provided with bands or stripes of ink so chemically treated, and, lastly, in taking the impression, each of said steps being, in substance, as set forth.

2. The herein-described improvement in the art of chromatic printing, which consists, first, in treating the ordinary printing-inks of commerce with balsam of copaiba, glycerine, petroleum, oil of sandal-wood, ether, and chloroform, substantially as described; secondly, in applying the inks thus treated to the form, and, thirdly, in taking an impression in two or more colors from this form, all substantially as and for the purpose set forth.

FRANCIS CORNWALL TAYLOR.

Witnesses:
R. C. CAMPBELL,
EDWARD S. BEACH.